United States Patent [19]

Yabe et al.

[11] Patent Number: 4,626,994
[45] Date of Patent: Dec. 2, 1986

[54] METHOD AND APPARATUS FOR CONTROLLING POWER STEERING

[75] Inventors: Hideo Yabe, Hiki; Ichiro Koike, Higashimatsuyama, both of Japan

[73] Assignee: Jidosha Kiki Co., Ltd., Tokyo, Japan

[21] Appl. No.: 625,400

[22] Filed: Jun. 28, 1984

[30] Foreign Application Priority Data

Jul. 9, 1983 [JP] Japan ............................ 58-124965

[51] Int. Cl.$^4$ ............................................. B62D 5/06
[52] U.S. Cl. ..................................... 364/424; 180/142
[58] Field of Search ............... 364/424, 425; 180/79.1, 180/132, 140–143; 74/388 PS

[56] References Cited

U.S. PATENT DOCUMENTS

| | | | |
|---|---|---|---|
| 4,216,841 | 8/1980 | Ohtuka et al. | 180/141 |
| 4,300,650 | 11/1981 | Weber | 180/143 |
| 4,320,812 | 3/1982 | Takaoka et al. | 180/143 |
| 4,412,592 | 11/1983 | Furukawa et al. | 180/142 |
| 4,417,640 | 11/1983 | Abe et al. | 180/142 |
| 4,473,128 | 9/1984 | Nakayama et al. | 180/79.1 |
| 4,476,529 | 10/1984 | Nakamura et al. | 364/424 |

Primary Examiner—Gary Chin
Attorney, Agent, or Firm—Townsend and Townsend

[57] ABSTRACT

Power steering control apparatus utilizing an oil pump comprises a car speed sensor producing a car speed signal, a steering sensor producing a steering signal, a mean car speed calculating circuit, a mean steering quantity calculating circuit, a car speed calculating circuit, pattern memory means storing a plurality of number of revolution characteristics of the oil pump corresponding to different patterns, a selector selecting one of the number of revolution characteristics in accordance with the mean steering quantity and the mean car speed, circuit means for deriving out a number of revolution signal of the oil pump corresponding to the car speed, and control means controlling rotation of the oil pump in accordance with the derived out revolution signal of the oil pump.

9 Claims, 18 Drawing Figures

METHOD AND APPARATUS FOR CONTROLLING POWER STEERING

BACKGROUND OF THE INVENTION

This invention relates to a method and apparatus for controlling power steering.

Generally, the steering resistance of a motor car tends to increase as the car speed decreases so that when the steering resistance is cancelled by using a power steering device wherein oil is circulated by the operation of an oil pump, a satisfactory steering can be made with a small steering force even when the car speed is low. For this reason a power steering device has been used wherein the number of revolutions of the oil pump is increased when the car speed is low whereas as the car speed increases the number of revolutions of the oil pump is decreased, thereby enabling smooth steering. When the car speed increases to a predetermined speed above which power steering is not necessary the oil pump is stopped to save energy.

However on a downward path including many sharp curves, even when the car runs at a relatively high speed a large steering resistance is created. However, with the prior art power steering device utilizing a conventional control method and apparatus the oil pump stops when the car speed exceeds a predetermined value so that when the car runs down along a downward path including many sharp curves the power steering device would not operate thus requiring a large steering force. This difficulty can be obviated by increasing the car speed at which the oil pump stops, but with such measure, even when the car runs on a straight plane path the oil pump would stop thus consuming energy.

SUMMARY OF THE INVENTION

Accordingly, it is an object of this invention to provide a novel method and apparatus for controlling power steering capable of providing an optimum drive control commensurate with the running condition of a motor car while saving energy.

Another object of this invention is to provide a novel method and apparatus for controlling the power steering according to the best steering method for the running place of the car without giving any anxious feeling to the driver.

In order to achieve the above objects of the present invention, a plurality of control characteristics of an electric actuator in the power steering device in association with car speeds are prepared, and a proper control characteristic is selected in accordance with the car speed signal and the steering signal so as to control the power steering device in accordance with the running condition.

According to an aspect of the present invention, there is provided a method of controlling a power steering device comprising the steps of:

calculating a mean car speed in a unit time in accordance with a car speed signal;

calculating a mean steering quantity in the unit time in accordance with a steering signal representing a steering quantity;

preparing a plurality of types of characteristic each representing a relationship between a car speed and a parameter in relation with a current flowing through an electric actuator for driving a power steering device;

selecting one of the plurality of types of characteristic in accordance with the mean steering quantity and the mean car speed, and controlling the electric actuator in accordance with the selected type of characteristic to cause the electric actuator to optimally operate the power steering device.

According to another aspect of the present invention, there is provided power steering control apparatus comprising:

a steering sensor for producing a steering signal representing a steering quantity of a steering wheel of a car;

a car speed sensor for producing a car speed signal representing a car speed of the car;

a mean car speed calculating circuit calculating a mean car speed based on the car speed signal;

a mean steering quantity calculating means for calculating a mean steering quantity based on the steering signal;

a car speed calculating means calculating a car speed in accordance with the car speed signal;

pattern memory means storing a plurality of types of characteristic each representing a relationship between the car speed and a parameter in relation with a current flowing through an electric actuator for driving a power steering device;

a selection circuit selecting one of the plurality of types of characteristic in accordance with the mean steering quantity and the mean car speed; and control means for controlling the electric actuator in accordance with a selected one of the plurality of types of characteristic so as to optimize the power steering device.

DESCRIPTION OF THE PREFERRED EMBODIMENTS

Figure 1:
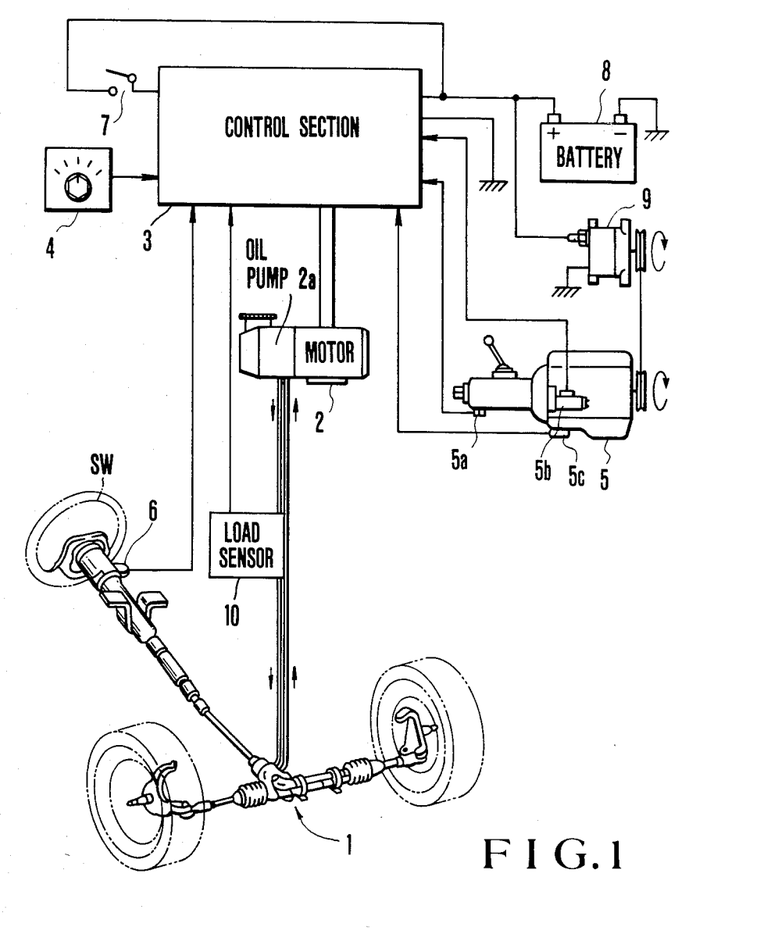
FIG. 1 is a representation showing the overall configuration of a power steering device employing a power steering control apparatus according to an embodiment of the present invention.

FIG. 1 shows a power steering device employing a power steering control apparatus according to an embodiment of the present invention. Referring to FIG. 1, reference numeral 1 denotes a steering section including a steering wheel SW; 2, a motor for driving an oil pump 2a; 3, a control section; 4, a selection switch for selecting a steering characteristic; 5, an engine; 5a, a speed sensor; 5b, a starter sensor; 5c, an engine sensor; 6, a steering sensor; 7, an ignition switch; 8, a battery; 9, an alternator; and 10, a load sensor for detecting a power steering state in accordance with, for example, hydraulic pressure. The oil pump 2a and the motor 2 serve as an electric actuator.

Figure 2:
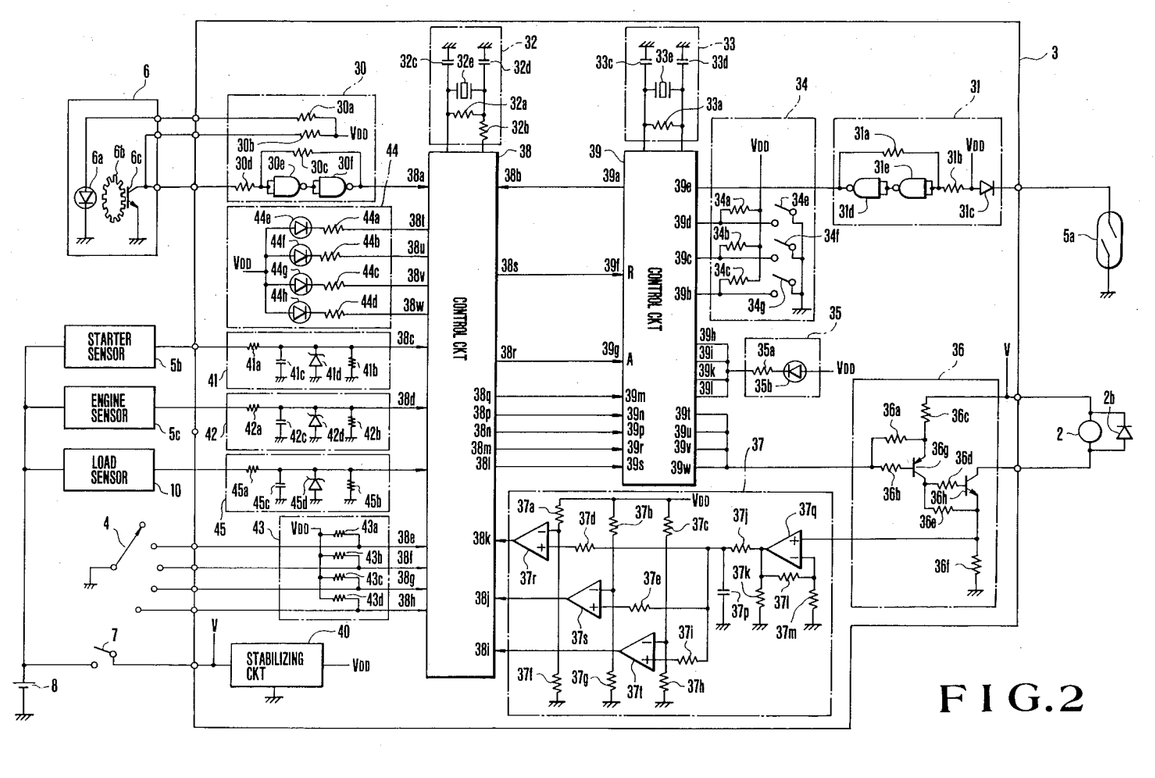
FIG. 2 is a circuit diagram of a the power steering control apparatus shown in FIG. 1.

FIG. 2 is a circuit diagram of the control section shown in FIG. 1. Referring to FIG. 2, the steering sensor 6 comprises a light-emitting diode 6a, a slit disk 6b and a phototransistor 6c and generates pulses whose number corresponds to a steering angle. A voltage from the battery 8 is applied to the starter sensor 5b when a starter motor (not shown) is operated to start the engine 5. The voltage from the battery 8 is applied to the engine sensor 5c while the engine 5 is operated. The voltage from the battery 8 is supplied to the load sensor 10 when the power steering operation is performed. A diode 2b connected in parallel with the motor 2 serves as a transient voltage absorbing diode. The control section 3 comprises waveform shapers 30 and 31, oscillators 32 and 33, a frequency division ratio setting circuit 34, an alarm indicator 35, a switching circuit 36, a current value discriminator 37, control circuits 38 and 39, stabilizing circuits 40, 41, 42 and 45, a pull-up circuit 43, and a steering characteristic indicator unit 44.

The waveform shaper 30 comprises resistors 30a to 30d and NAND gates 30e and 30f. The waveform shaper 31 comprises resistors 31a and 31b, a diode 31c and NAND gates 31d and 31e. The oscillator 32 comprises resistors 32a and 32b, capacitors 32c and 32d and a ceramic oscillator 32e. The oscillator 33 comprises a resistor 33a, capacitors 33c and 33d and a ceramic oscillator 33e. The frequency division ratio setting circuit 34 comprises resistors 34a to 34c and switches 34e to 34g. Since the number of pulses generated by the speed sensor 5a per unit travel distance varies in accordance with the type of car, the switches 34e to 34g are properly set to control a frequency division ratio of the frequency divider incorporated in the control circuit 39. In this way, the number of pulses appearing at a terminal 39a per unit travel distance is given to be constant irrespective of the type of car. The alarm indicator 35 comprises a resistor 35a and a light-emitting diode 35b. The switching circuit 36 comprises resistors 36a to 36f and transistors 36g and 36h. The current value discriminator 37 comprises resistors 37a to 37m, a capacitor 37p, an amplifier 37q and comparators 37r to 37t and discriminates whether or not an actual current flowing through the motor 2 exceeds one of three reference values.

The control circuit 38 performs processing (to be described later) in accordance with the signals supplied to terminals 38a to 38k and 38y and generates a 5-bit parallel signal whose bit pulses respectively appear at terminals 38l, 38m, 38n, 39p and 38q. The control circuit 38 generates an alarm signal from a terminal 38r thereof and a reset signal from a terminal 38s thereof. The control circuit 38 also generates a zero level signal from any one of terminals 38t to 38w so as to turn on the corresponding light-emitting diode which indicates a predetermined steering state. The control circuit 39 divides the frequency of the signal supplied to a terminal 39e at a frequency ratio represented by the signal supplied to terminals 39b to 39d. The frequency-divided signal appears at the terminal 39a. When a signal is supplied to a terminal 39f, the control circuit 39 is reset. When a terminal 39g of the control circuit 39 receives a signal, a zero level signal appears at terminals 39h to 39l. The control circuit 39 also generates a duty variable signal from terminals 39t to 39w in response to the signal supplied to terminals 39m to 39s.

The stabilizing circuits 40 to 42 and 45 stabilize the input voltages and generate stable voltages of 5 V, respectively. The stabilizing circuit 41 comprises resistors 41a and 41b, a capacitor 41c and a Zener diode 41d. The stabilizing circuit 42 comprises resistors 42a and 42b, a capacitor 42c and a Zener diode 42d. Similarly, the stabilizing circuit 45 comprises resistors 45a and 45b, a capacitor 45c and a Zener diode 45d. The pull-up circuit 43 comprises resistors 43a to 43d. The indicator unit 44 comprises resistors 44a to 44d and light-emitting diodes 44e to 44h so as to indicate the steering state automatically selected by the control circuit 38 or manually selected by the switch 4. Manual selection by the switch 4 has priority over automatic selection by the control circuit 38.

The control circuit 38 discriminates whether the car is travelling or running along a mountain road or a city road in accordance with the steering signal supplied to the terminal 38a, the car speed signal supplied to the terminal 38b and the load signal supplied from the load sensor 10. The control circuit 38 controls an optimal revolution of the oil pump 2a in accordance with the discrimination result.

The operation of the control apparatus will now be described with reference to the flow chart shown in FIG. 3.

Thus, at step A the car speed signal and the steering signal are taken in and stored in a memory device in the control apparatus. These two signals are taken in because at the succeeding steps C and D these two signals are necessary at the same time.

At step B a judgement is made as to whether the car is running or not by using the car signal taken in at step A. When the result of judgement executed at step B is YES, that is when the car is judged in the running state, at step C the mean car speed is calculated, and then at step D a mean steering quantity or angle is calculated. These mean car speed and the mean steering quantity are obtained by measuring variations in the car speed signal and the steering signal in a unit time.

Figure 4A:
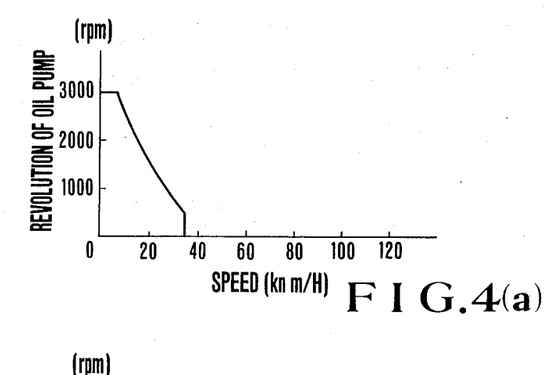
FIGS. 4A to 4D are respectively graphs showing the oil pump revolution characteristics under different running conditions.
Figure 4B:
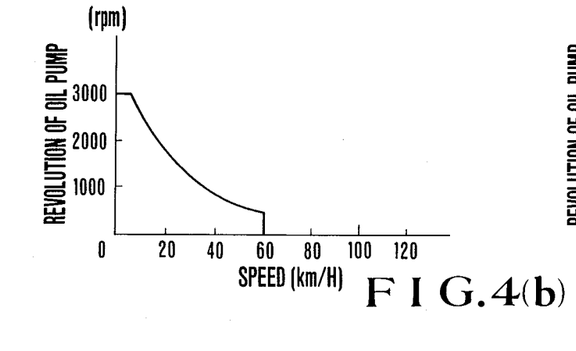
Figure 4C:
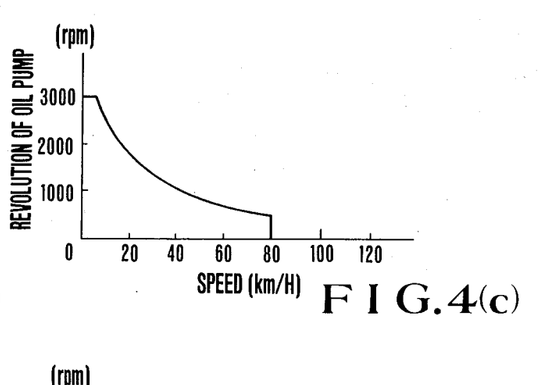
Figure 4D:
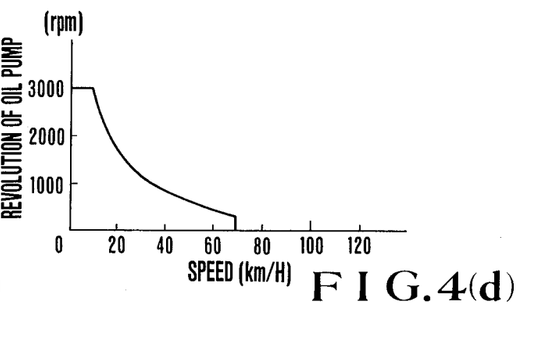
Figure 5:
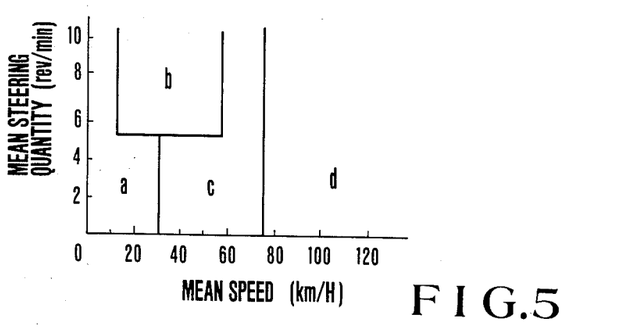
FIG. 5 is a graph showing the combination of oil pump revolution characteristics.

At step E, the revolution characteristic of the oil pump suitable for the running condition at that time is read out. The revolution characteristic of the oil pump determines the number of revolutions of the oil pump suitable for the car speed and these characteristics differ as shown in FIGS. 4a-4d according to the running conditions. In FIGS. 4a-4d, the abscissa represents the car speed at given running points and the ordinate the number of revolutions of the oil pump. For example, while running a city area in which road width is narrow and running in only one direction is permitted, since the car must turn many times the oil pump 2a is required to continue its operation up to speed of about 35 Km/H which is the permissible as the maximum speed in the city area. As a consequence, under this condition a characteristic as shown in FIG. 4a is suitable. When running along roads outside of the city area, the car speed is high so that a characteristic as shown in FIG. 4b is suitable. When running down along a mountain road, the car speed increases over that when the car runs along a common road, but as it is necessary to operate the power steering device up to a high car speed, a characteristic as shown in FIG. 4c is suitable. On the other hand, when the car runs at a high speed on a high speed road, the power steering is not necessary so that the oil pump 2a is stopped. But in order to smoothly stop the power steering when the speed is changed from a medium speed to a high speed, a characteristic in which the minimum number of revolution is small just prior to the stop of the oil pump as shown in FIG. 4d is desired. Thus by prestoring characteristics suitable for respective running conditions in the memory device and then reading out the stored characteristics at step E in accordance with the mean steering quantity and the mean car speed it is possible to always read out characteristics commensurate with the running conditions. While the running condition is determined by the mean car speed and the steering quantity, the relation between these variables and the revolution characteristic of the oil pump can be made as shown in FIG. 5, for example. In FIG. 5, a through d show the characteristics shown in FIGS. 4a–4d respectively.

After the revolution characteristic of the oil pump suitable for a given running condition has been read out from the memory device at step E, at step F a number of revolution signal of the oil pump for the car running speed is read out in accordance with the read out revolution characteristic of the oil pump. At step G, the read out revolution signal of the oil pump is sent to the oil pump from the control apparatus 3 so that the number of revolutions of the oil pump 2a is controlled to an optimum value adequate for the running condition.

When the result of judgement at step B is NO, that is a not running state is judged, at step H a judgement is made as to whether the steering is made or not based on the steering signal taken in at step A. When the result of judgement at step H is YES, that is when a steering judgement is judged, at step I the control apparatus 3 sends an optimum number of revolution signal, for example the maximum number of revolution of the pump, to the oil pump. When the result of judgement at step H is NO, it is necessary whether the steering is not made at all, or the steering is momentary stopped during running or the steering has not been made from the first time. In the first case, since the power steering is made, at step J a state in which there is a load signal is detected so as to continue sending out the optimum number of revolution signal of the oil pump. In the last case, a condition in which there is no load signal is detected and steps A, B, H and J are repeated until the next state change occurs.

Although at step H, the number of revolutions of the oil pump when the car does not run was assumed to the maximum number of revolutions because the load as seen from the steering wheel is the largest, it should be noted that the number of revolutions is not necessarily a maximum value because the driver's desire differs.

Figure 6:
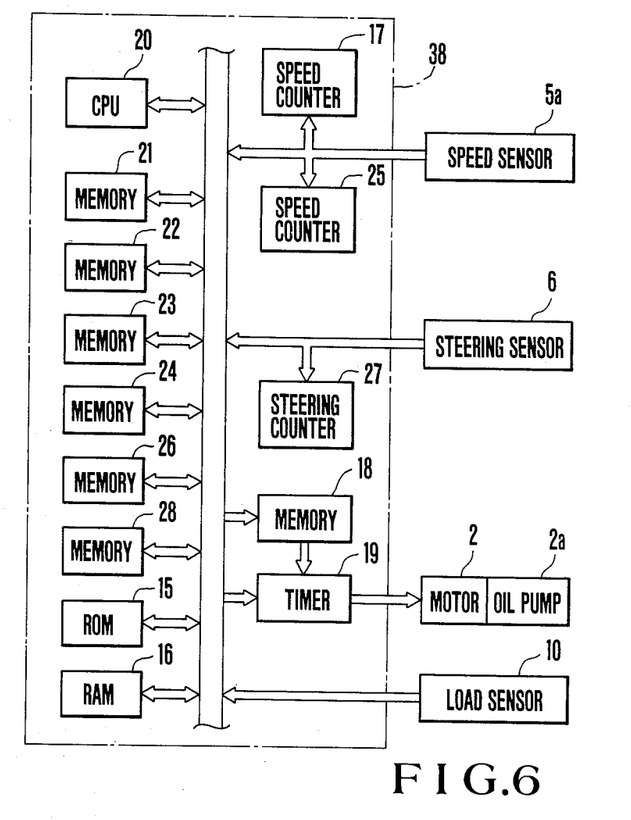
FIG. 6 is a block diagram showing an arrangement for performing the operation sequence shown in FIG. 3.
Figure 7:
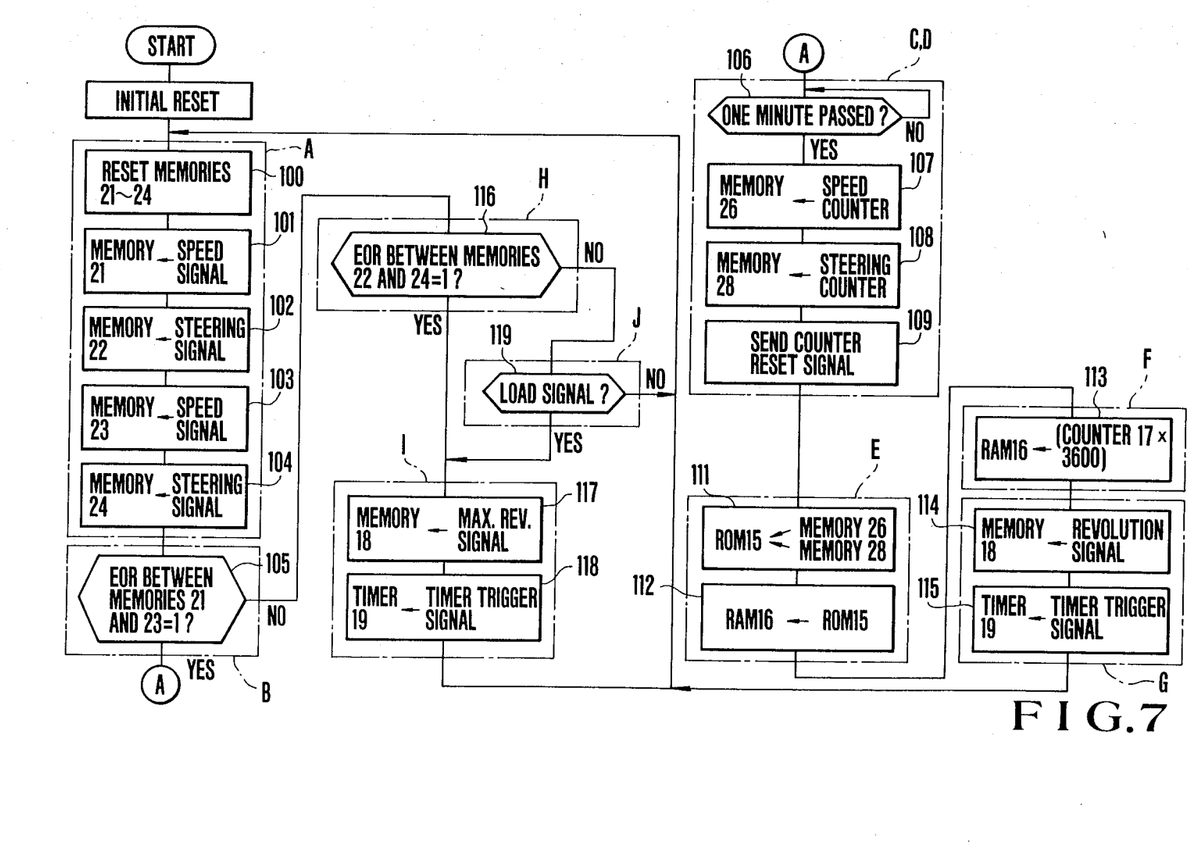
FIG. 7 is a flow chart showing a detailed operation of a control circuit 38 of FIG. 2.

FIG. 6 is a block diagram showing one embodiment of the power steering control apparatus of this invention which is constituted by a microcomputer and its operation is shown by a flow chart shown in FIG. 7.

Figure 3:
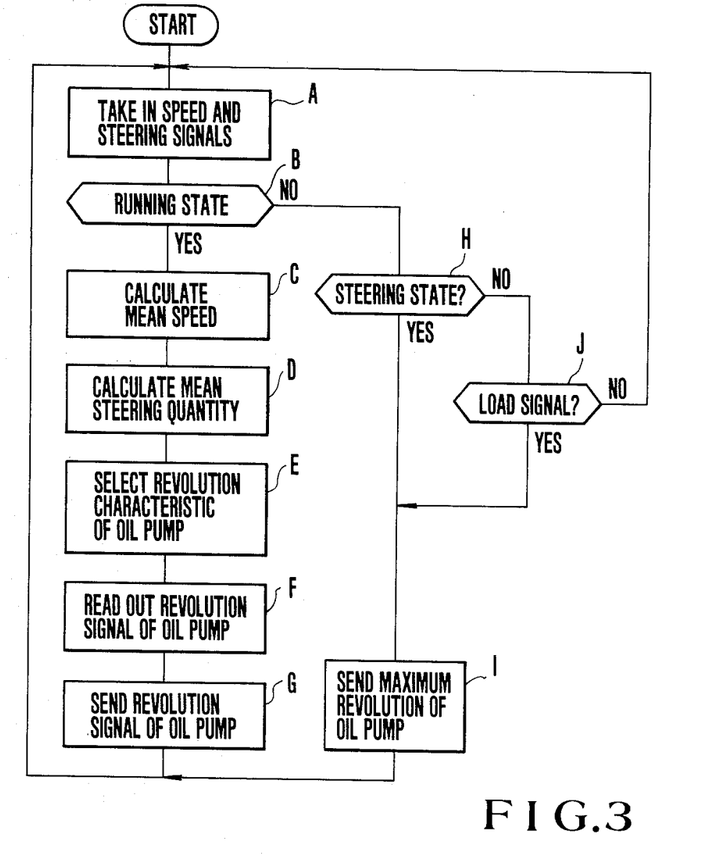
FIG. 3 is a flow chart for explaining the operation of the power steering control apparatus shown in FIG. 2.
Figure 8:
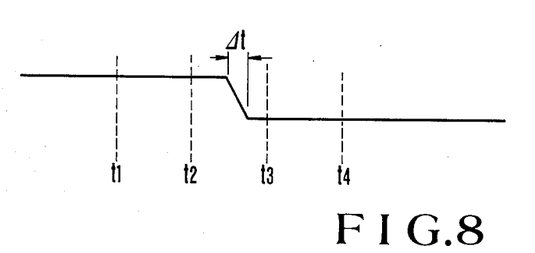
FIG. 8 is a representation showing timings of steps 101 to 104 of FIG. 6.

The flow chart shown in FIG. 7 shows the detail of the steps A through K shown in FIG. 3 and the steps A–J bounded by dot and dash lines correspond to the steps A–J shown in FIG. 3. After an initial reset has been made, at step 100, a CPU 120 shown in FIG. 6 resets memory devices 21-24. Then at step 101, a car speed signal is stored in a memory device 21, at step 102, a steering signal is stored in a memory device 22, at step 103 a car speed signal is stored in a memory device 23 and at step 104 a steering signal is stored in a memory device 24. As shown in FIG. 8, the levels of the car speed signal and the steering signal become stable after a time delay $\Delta t$. Accordingly the timings are set such that the steps 101, 102, 103 and 104 are executed at times t1, t2, t3 and t4 respectively shown in FIG. 8, so that the levels become different at the first and last steps when the level changes. The levels of the car speed signal and the steering signal become "0" or "1" when the car is not running and the steering wheel is not rotated. For this reason, the steps B and H should be set such that the judgement of the running state or the steering state should be made according to the variation in the signal level. To this end, the operating timings of the respective steps should be determined such that the variation states of the input signals should be accurately determined.

As shown by step 105, step B is constructed to supervise the exclusive logic sum (EOR) of the memory devices 21 and 23. When the EOR outputs of the signal levels are stored in the memory devices 21 and 23 as "1" the signal levels stored in the memory devices 21 and 23 are different which means a state in which the input signal is varying. At this time, a running state is judged. Steps C and D are executed as shown by steps 106 through 109. At step 106 whether a unit time of one minute has elapsed or not is judged. When one minute has elapsed, at step 107 the count of the car speed counter 25 is stored in a memory device 26, and at step 108, the count of the steering counter 27 is stored in a memory device 28. At step 109 a counter reset signal is sent out so that counters 25 and 27 start to count the numbers of the car speed signal and the steering signal. The resetting of the counters 25 and 27 at the time of starting the operation is effected by an initial resetting. In this manner, by taking one minute as a unit time the mean car speed and the mean steering quantity in one minute can be obtained by counting the numbers of the car speed signals and the steering signals in the unit time.

As shown by step 111, at step E, the mean car speed stored in the memory device 26 and the mean steering quantity stored in the memory device 128 are supplied to a ROM 15 written with several types of the number of revolution characteristics of the oil pump to read out the revolution characteristics of the oil pump for storing the read out characteristics in a RAM 16. As shown by step 113, step F is used to calculate the car speed in Km/hour. This calculation is made in the following manner. More particularly, a counter 17 counts the number of the car speed signals supplied from the speed sensor 5a while updating its count at each one second. Thus, by multiplying the count of the counter 5a with 3600 the car speed in Km/hour can be calculated and by supplying the product to RAM 16 the number of revolutions of the oil pump can be read out. As shown by step 114, at step G, the revolution signal read out from RAM 16 is stored in a memory device 18 so as to send a time drive signal to a timer 19 as shown by step 115. For this reason, the revolution signal stored in the memory device 18 is supplied to the motor 2 for the operating time of the timer 19 so that the oil pump 2a rotates in accordance with the number of revolution signal. The operating time of the timer 19 is set to a time slightly longer than one second.

The control apparatus 38 takes in new car speed signal and steering signal, and in the steps following step 106 new data are used at each one minute, while in the steps following step 113 new data are used at each one minute so that a rotational number characteristic of the oil pump suitable for the running condition at that time would be selected. Consequently, the number of revolutions of the oil pump 2a is reset at each one second and the selected number of revolutions is controlled to that most suitable for the running condition.

When the result of judgement executed at step B is NO, that is most running condition, at step H a judgement is made as to whether the state is the steering state or not. This operation is similar to that executed at step B. More particularly, as shown by step 116, an exclusive logic sum of the contents of memory devices 22 and 24 is calculated so as to judge a steering state when the steering signal levels at different times are not equal, whereas a nonsteering state when the steering signal levels are the same.

Step I operates in the same manner as step G. More particularly, at step 117 the maximum number of revolution signal is stored in a memory device 18, while at step 118, a timer drive signal is sent to a timer 19. As a consequence, the maximum number of rotation signal is supplied to motor 2 and the oil pump 2a for the operating time of the timer 19. After sending out the timer drive signal at step 118, the control apparatus returns to step 100 so that this operation is repeated so long as the steering state persists to supply the maximum number of revolution signal to motor 2 and oil pump 2a.

Since step J is provided only for the purpose of judging whether a load signal is present or not, it is only necessary to supervise the output of the load sensor 10 at step 119.

Figure 9:
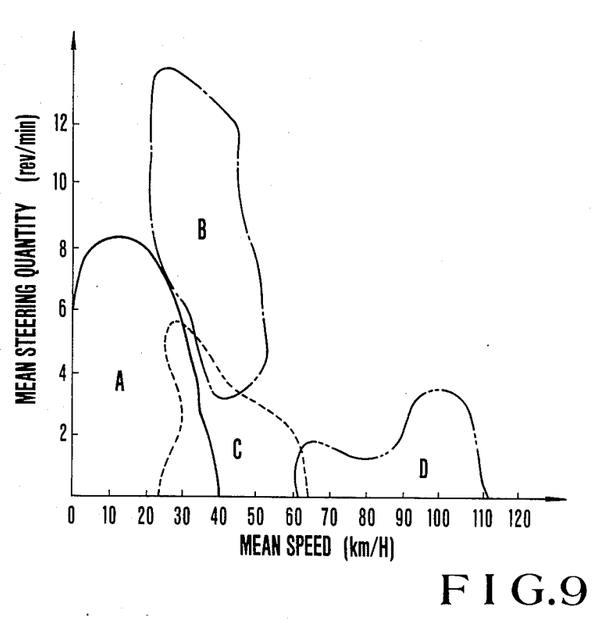
FIG. 9 is a graph showing the relationship between the mean speed of a car actually running on a road and the mean steering quantity.

FIG. 9 is a graph showing the relationship between the mean car speed and the mean steering quantity when the power steering control apparatus is installed in the car and the car is actually driven on the road. Referring to FIG. 9, the mean steering quantity represents the number of revolutions per minute. A region A represents the distribution for the relationship between the mean car speed and the mean steering quantity when the car is running on a city road; B, on a mountain road; C, on an urban road; and D, on a highway. The method of the present invention is proved to satisfy steering states for all actual road conditions.

Figure 10:
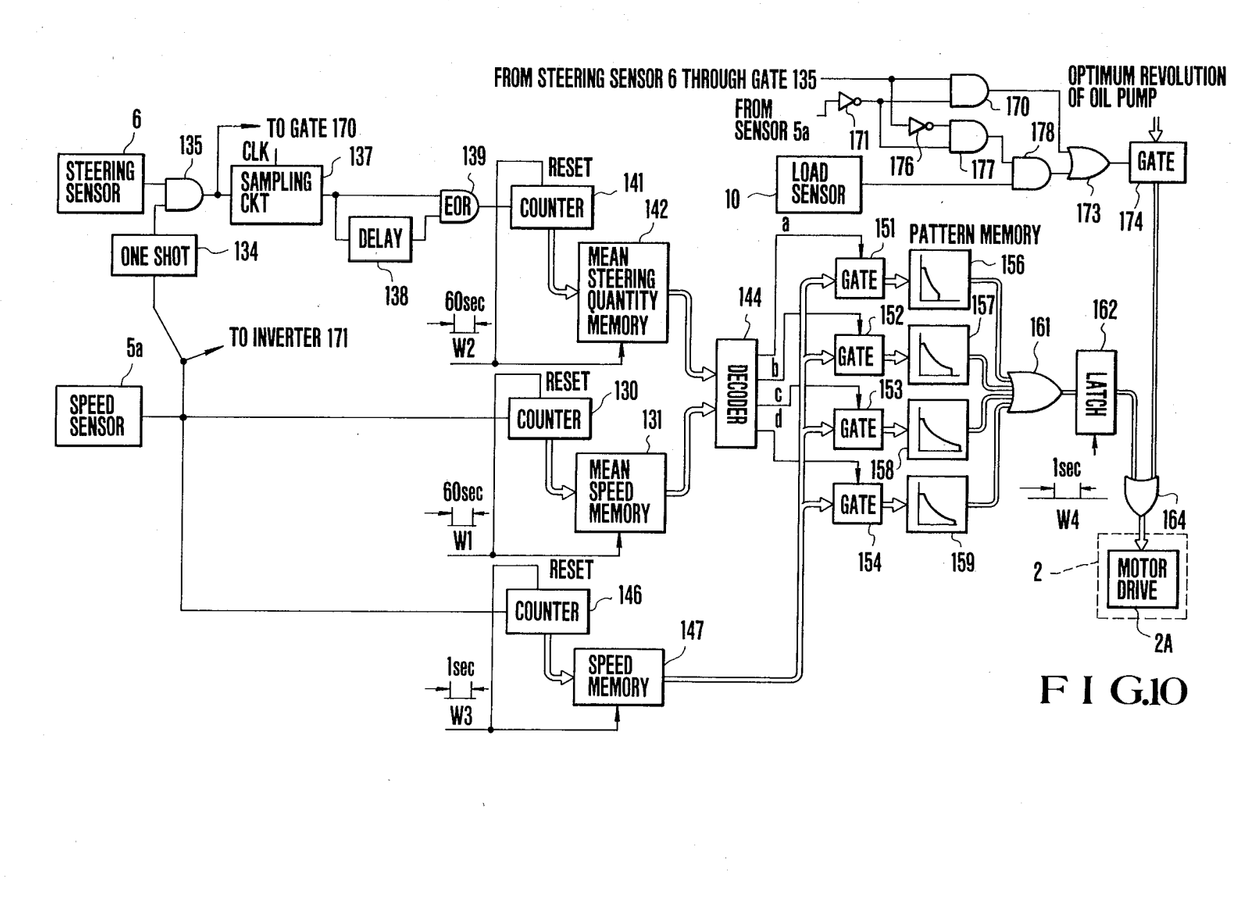
FIG. 10 is a functional block diagram of the power steering apparatus shown in FIG. 2.

FIG. 10 is a functional block diagram of the power steering control apparatus for performing the above operation. The same reference numerals used in FIG. 10 denote the same parts as in the above-mentioned embodiment.

In FIG. 10, the car signal pulse produced by the car speed sensor 5a is applied to a counter 130 to be sequentially counted. The counter 130 counts the number of the outputs of the car speed sensor 5a for a definite time interval and its count is stored in a mean car speed memory 131 as the mean car speed signal. Each time a write pulse W1 given at an interval of 60 seconds, for example, is applied, the mean car speed memory 131 takes in the output of the counter 130 which also receives the write pulse to be reset immediately after the memory 131 has taken in the content of the counter 130 and then counts the number of pulses sent from the car speed sensor 5a. The content of the mean car speed memory 131 is sent to a decoder 144 as one input as will be described later in detail.

The steering signal produced by the steering sensor 6 which represents the quantity of steering and having a sign corresponding to the direction of rotation of the steering wheel is sent to a sampling circuit 137 via an AND gate circuit 135. This AND gate circuit 135 is enabled when the output of the car speed sensor 5a is applied to its other input via a one shot circuit 134 to produce the output of the steering sensor 6. In accordance with a clock pulse CLK acting as a sampling pulse, the sampling circuit 137 forms a signal having a definite sign irrespective of the sign of the supplied steering signal. The clock pulse CLK has a frequency of 800 KHz for example. The output of the sampling circuit 137 is applied directly to one input of an exclusive OR gate circuit 139 and to the other input thereof via a delay circuit 138. The delay circuit 138 functions to delay the input signal by one period of the sample pulse, 1.5 microsec. for example. Consequently, the exclusive OR gate circuit 139 produces an output when a sampled steering signal sequentially sent out from the sampling circuit 137 does not coincide with an immediately preceding sampled steering signal. As a consequence, the output of the exclusive OR gate circuit 139 represents whether steering is made or not, and these outputs are sent to a counter 141 to be counted sequentially. The counter 141 counts the number of the outputs of the steering sensor 6 for a definite time and the count thereof is stored in a mean steering quantity memory 142 as the mean steering signal. Each time a write pulse W2 is given to the mean steering quantity memory 142 in synchronism with the write pulse W1 having an interval of 60 seconds, for example, and applied to the mean car speed memory 131, the mean steering quantity memory 142 takes in the output of the counter 141 which is reset immediately after the memory 142 has taken in the content of the counter 141 and then starts to count the number of the pulses given from the steering quantity sensor 16. The output of the mean steering quantity memory 142 is sent to the decoder 144.

The decoder 144 determines the place at which the car runs, that is the running condition in accordance with the table shown in FIG. 5 and based on the mean steering quantity signal from the memory 142 and the mean car speed signal from the mean car speed memory 131. According to the result of this determination, an output is produced on either one of four output lines to enable either one of four corresponding gate circuits 151-154 which are supplied with the car speed signal from the car speed memory 147. Accordingly, the selected one of the gate circuits 151-154 supplies the output of the car speed memory 147, that is the car speed signal to either one of four corresponding pattern memory 156-159 as an address signal. Where the gate circuit 151 is selected, for example, the car speed signal is applied to the pattern memory 156 as the address signal.

The output of the car speed sensor 5a is sent to a counter 146 to count the car speed. This counter 146 counts the number of the outputs of the car speed sensor 5a for a definite time and its output is stored in a car speed memory 147 as a car speed signal. The car speed memory 147 takes in the output of the counter 141 each time it is supplied with a write pulse W3 which is synchronism with the write pulses W1 and W2 utilized to write memories 131 and 142 but having a shorter period than these write pulses, for example 1 second. Then upon reception of the write pulse W3, the counter 146 would be immediately reset when the memory 147 takes in the content of the counter 146 and begin to count the number of the car speed signal pulses sent from the car speed sensor 5a. The content of the car speed memory 147 is sent to gate circuits 151–154 to be described later.

Consequently, the pattern memory devices 156–159 send the number of revolution signals of the pump (in digital form) stored in designated addresses to a latch register 162 via an OR gate circuit 161. The latch register 162 stores the outputs of the pattern memory devices 156–159 sent through the OR gate circuit 161 in accordance with a latch pulse having a period of 1 second and synchronous with the write pulse W1–W3. The signal latched by the latch register 162 represents the number of revolutions of the pump related to the running speed while the car is running, and this signal is sent to a motor drive circuit 2A of the electric actuator via OR gate circuit 164 for controlling the motor 15 so that it drives the pump 2a out a number of revolutions described above.

The output of the steering sensor 6 is also sent to one input of an AND gate circuit 170 via the AND gate circuit 135, the other input of the AND gate circuit 170 being supplied with the output of the car speed sensor 5a via an inverter 171. Thus, the AND gate circuit 170 produces an output when the steering sensor 6 produces an output as a result of the operation of the steering wheel SW even though the car does not run, and the output of the AND gate circuit 170 is sent to a gate circuit 174 via an OR gate circuit 173. As a consequence, during the car stop, an optimum number of revolution signal of the pump (for example, a number of revolution signal representing the highest pump speed) is sent to the motor drive circuit 2A via an OR gate circuit 164. As a consequence, the motor 2 is controlled to drive the pump at an optimum number of revolutions.

The output of the AND gate circuit 135 is also supplied to one input of an AND gate circuit 177 via an inverter 176, the other input of the AND gate circuit 177 being supplied with the output of an inverter 171 with the result that the AND gate circuit 177 sends its output to one input of an AND gate circuit 178 when the car does not run and the steering wheel is not rotated. The AND gate circuit 178 is enabled when it receives the output of the AND gate circuit 177 and the output of the load sensor 10 to send its output to the gate circuit 174 via OR gate circuit 173. As a consequence, an optimum pump revolution number signal would be sent to the motor drive circuit 2A through the OR gate circuit 164. Thus, this state represents the fact that the pump load has become larger than a predetermined value even though the car is not running and the steering is not effected. Accordingly, the motor drive circuit 2A controls the pump 2a such that it is driven at a number of revolution (for example, at the highest speed) commensurate with the pump load.

Figure 15:
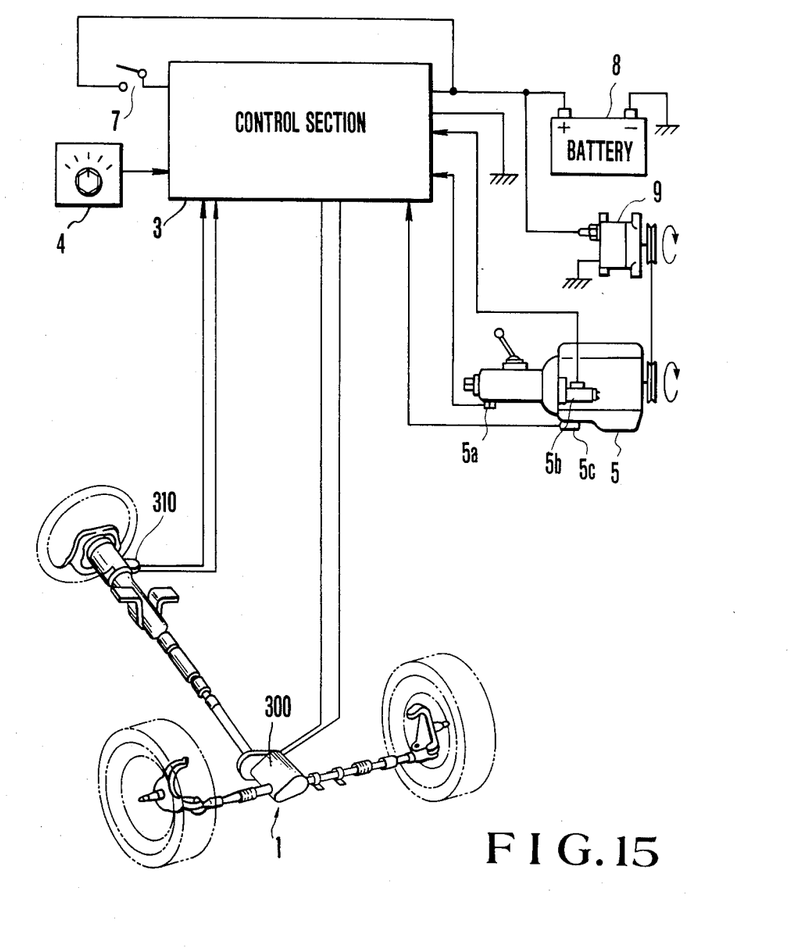
FIG. 15 is a representation showing the overall configuration of a power steering device employing a power steering control device according to still another embodiment of the present invention.

FIG. 15 shows a power steering device employing a power steering control apparatus according to another embodiment. According to the power steering device to which the present invention is applied, a steering section 1 is directly driven by the motor. A motor 300 is built into a steering section 1 in FIG. 15. The motor 300 serves as the electric actuator itself. In this case, a steering sensor 6 and an input torque sensor 310 are arranged in the steering shaft. Power steering devices of this type are described in Japanese Patent Disclosure No. 58-53562 and French Patent No. 8,111,134.

Figure 11:
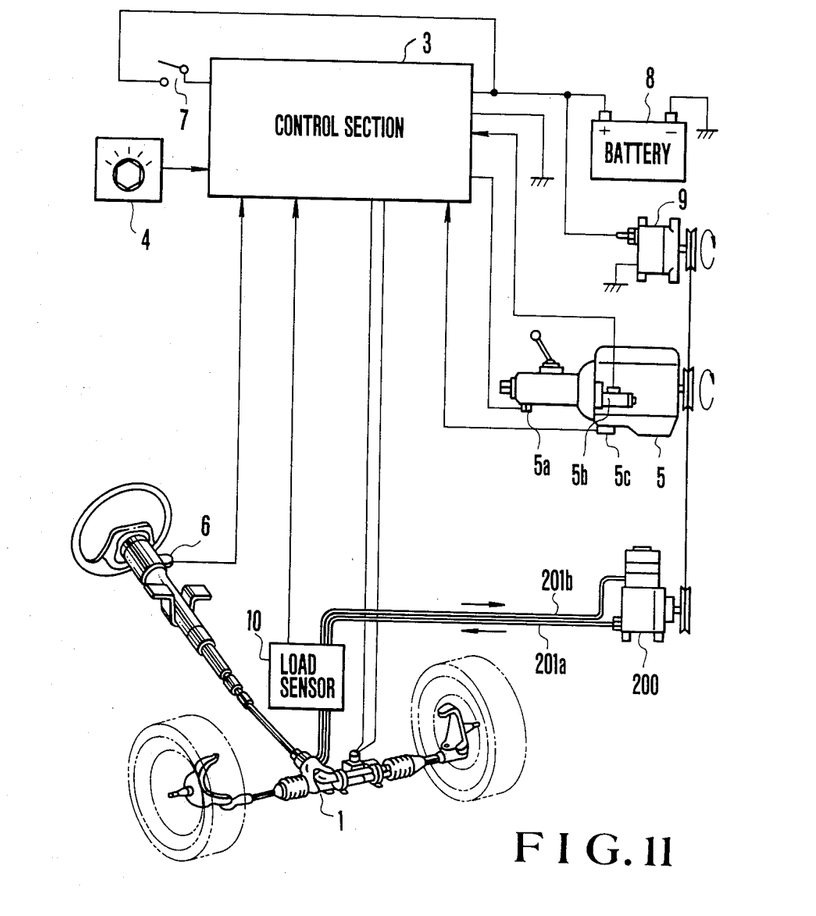
FIG. 11 is a representation showing a power steering device employing a power steering control apparatus according to another embodiment of the present invention.

In both the power steering devices of FIG. 11 and 15 (the power steering device of FIG. 11 will be described later), the power steering sections are controlled in accordance with magnitudes of currents flowing in the electric actuators, respectively. In other words, one of a plurality of characteristics representing relationships between car speeds and electric actuator input signals (currents or voltages) is selected in accordance with the actual car speed and the steering signal, and the electric actuator is controlled in accordance with the selected characteristic.

FIG. 11 shows a still another embodiment of the present invention. The same reference numerals used in FIG. 11 denote the same parts as in the previous embodiments. In the power steering device to which the present invention is applied, the oil pump is directly driven by the engine through a belt unlike the embodiment (FIG. 1) wherein the oil pump is driven by the motor. All other arrangements of FIG. 11 are the same as those of the previous embodiments. Therefore, only the components different from those in the previous embodiments will be described.

Figure 12:
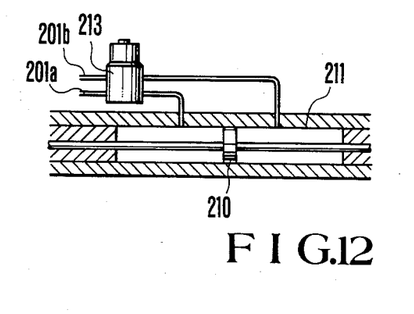
FIG. 12 is a sectional view showing a steering section of the power steering device of FIG. 11.

An oil pump 200 is connected to a steering section 1 through oil pipes 201a and 201b. A load sensor 10 is arranged midway along the oil pipes 201a and 201b. As shown in FIG. 12, a cylinder chamber 211 is formed in the steering section 1 to reciprocally move a piston 210 therein. The piston 210 constitutes part of a steering link system. The piston 210 held in the cylinder chamber 211 is reciprocally moved under the control of an electromagnetic control valve 213 serving as the electric actuator.

Figure 13:
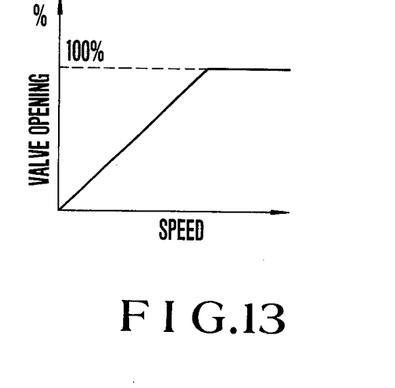
FIG. 13 is a graph showing the relationship between the valve opening of a control valve (FIG. 13) and the car speed.
Figure 14:
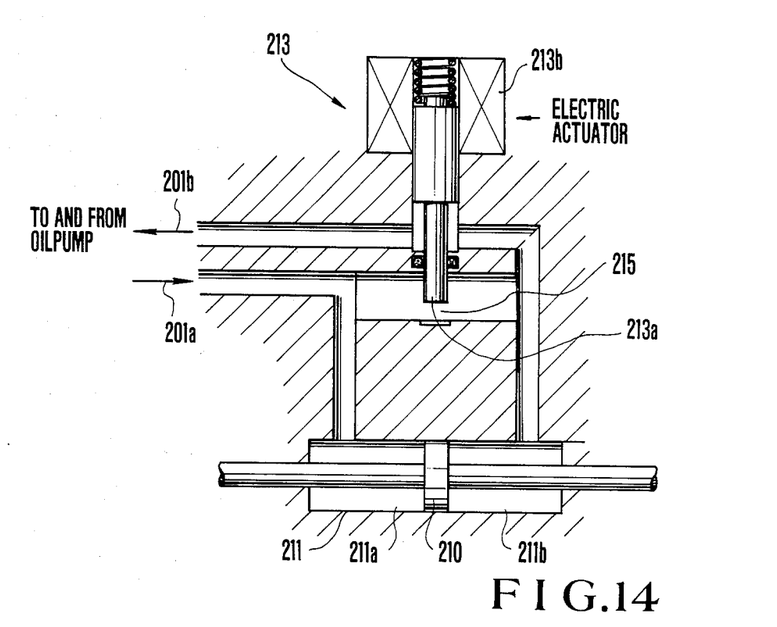
FIG. 14 is an enlarged sectional view of the steering section shown in FIG. 12.

The controlled behavior is illustrated in FIG. 13. The opening of the valve changes in accordance with the car speed. When the opening of the valve 213 changes, the bypass quantity in a left cylinder chamber portion 211a relative to that of a right cylinder chamber portion 211b through the piston 210 changes. The detailed construction of the steering section 1 is illustrated in FIG. 14. The oil pipe 201a communicates with the left cylinder chamber portion 211a, and the oil pipe 201b communicates with the right cylinder chamber portion 211b. A bypass valve 213a is disposed on a bypass path 215 in parallel with the main oil path 211 between the oil pipes 201a and 201b. The bypass valve 213a is vertically moved in accordance with a biasing force of a solenoid 213b in the electric actuator 213. When a current flowing through the solenoid 213b increases, the bypass valve 213a is moved upward to open the bypass path wide so as to increase leakage between the oil pipes 201a and 201b, thereby decreasing the output of the power steering device. The above construction is known to a person skilled in the art and is described in Japanese Patent Disclosure No. 55-29671.

As above described according to the method and apparatus for controlling power steering, the number of revolutions of the oil pump is controlled in accordance with the revolution characteristic of the oil pump most suitable for a given running condition so that under any running condition, the steering can be made smoothly.

It should be understood that the invention is not limited to the specific embodiments described above and that many changes and modifications can be made without departing the true spirit and scope of the invention. For example, in FIG. 10 instead of making the interval of operation of the mean car speed memory device 131 and the mean steering quantity memory device 142 to be 60 seconds, this interval may be made to about 30 seconds. This interval or period varies depending upon such factors as the clock pulse frequency, the required follow up characteristic or the like. The same is true for the write pulse of the car speed memory device and the latch pulse of the latch register 162. If desired, the period can be changed to other values.

Although FIG. 10 shows only the basic construction necessary to understand the invention, when designing a practical circuit many other circuit elements are added.

The revolution characteristic of the oil pump is not limited to the four patterns shown in FIGS. 4a–4d, but it may be two or five. Thus the number of characteristics can be increased or decreased in accordance with the desired smooth steering characteristic.

What is claimed is:

1. A method of controlling a power steering device comprising the steps of:

calculating a mean car speed in a unit time in accordance with a car speed signal;

calculating a mean steering parameter in the unit time in accordance with a steering signal representing said steering parameter;

providing a plurality of types of characteristics each representing a relationship between car speed and a parameter representative of a current to be supplied to an electric actuator for driving a power steering device;

selecting one of said plurality of type of characteristics in accordance with said mean steering parameter and said mean car speed, and controlling said electric actuator in accordance with said selected type of characteristics to cause the electric actuator to optimally operate the power steering device, said step of controlling including the steps of calculating an actual car speed, selecting the value of said representative current parameter in accordance with said actual car speed, and supplying said selected value of said representative current parameter to said electric actuator.

2. A method of controlling a power steering device wherein the number of revolutions of an oil pump is controlled to control power steering, said method comprising the steps of:

calculating a mean car speed in a unit time in accordance with a car speed signal;

calculating a mean steering parameter in the unit time in accordance with a steering signal representing said steering parameter;

providing a plurality of types of number of revolutions characteristics of the oil pump respectively specifying a relation between car speed and the number of revolutions of said oil pump when the car runs;

selecting one of said plurality of number of revolutions characteristics in accordance with said mean steering parameter and said mean car speed, and controlling said oil pump in accordance with said selected one of said number of revolutions characteristics to cause the oil pump to rotate at a number of revolutions optimal for the car speed as the car runs, said step of controlling including the step of calculating an actual car speed and selecting the value of the number of revolutions in accordance with said actual car speed.

3. Power steering control apparatus comprising:

a steering sensor for producing a steering signal representing a steering parameter of a steering wheel of a car;

a car speed sensor for producing a car speed signal representing a car speed of the car;

a mean car speed calculating circuit for calculating a mean car speed based on said car speed signal;

a mean steering parameter calculating means for calculating a mean steering parameter based on said steering signal;

a car speed calculating means for calculating an actual car speed in accordance with said car speed signal;

pattern memory means for storing a plurality of types of characteristics each representing a relationship between the car speed and a parameter representative of a current to be supplied to an electric actuator for driving a power steering device;

a selection circuit for selecting one of said plurality of types of characteristics in accordance with said mean steering parameter and said mean car speed; and control means for controlling said electric actuator in accordance with a selected one of said plurality of types of characteristics so as to optimize the power steering device, said control means including means for specifying the value of said current representative parameter in accordance with the actual car speed.

4. The apparatus according to claim 3, wherein said electric actuator comprises a motor directly coupled to said power steering device.

5. The apparatus according to claim 4, wherein said steering sensor comprises an input torque sensor mounted on a steering shaft of said power steering device.

6. The apparatus according to claim 3, wherein said electric actuator comprises an electromagnetic control valve which has a bypass valve and a solenoid, said bypass valve being provided on a bypass path in parallel with a main oil path to open in response to the current flowing through said solenoid.

7. Power steering control apparatus utilizing an oil pump comprising:

a car speed sensor for producing a car speed signal of a car;

a steering sensor for producing a steering signal representing a steering parameter of a steering wheel of the car;

a mean car speed calculating means for calculating a mean car speed based on said car speed signal;

a mean steering parameter calculating means for calculating a mean steering parameter based on said steering signal;

a car speed calculating means for calculating an actual car speed in accordance with said car speed signal;

pattern memory means for storing a plurality of number of revolution characteristics of the oil pump corresponding to different patterns each pattern specifying the relation between car speed and the number of revolutions of said oil pump as the car runs;

a selection means for selecting one of said number of revolution characteristics in accordance with said mean steering parameter and said mean car speed;

means for deriving a number of revolutions signal of said oil pump corresponding to said actual car speed; and control means for controlling rotation of said oil pump in accordance with said derived number of revolutions signal of said oil pump.

8. The power steering control apparatus according to claim 7 which further comprises a detection means for detecting the absence of an output from said car speed sensor and the presence of an output from said steering sensor, and a gate circuit coupled to the output of said detection means for providing an optimum number of revolutions signal to said control means when the output of said detection means signifies that the car is stationary and the steering wheel is being turned.

9. The power steering control apparatus according to claim 8 which further comprises another detection means for detecting the absence of an output from said car speed sensor and said steering sensor, a load sensor for detecting a load of said oil pump exceeding a predetermined value, and another gate circuit having an input coupled to said another detection means and said load sensor and an output coupled to said first mentioned gate circuit for enabling said first mentioned gate circuit to provide said optimum number of revolutions signal to said control means when the car and steering wheel are stationary and the load on said oil pump has exceeded said predetermined value.

* * * * *